UNITED STATES PATENT OFFICE.

JOHAN WOLFGANG MORGENEIER, OF SHEBOYGAN, WISCONSIN.

IMPROVEMENT IN VARNISHES FOR COATING PHOTOGRAPHIC NEGATIVES.

Specification forming part of Letters Patent No. 109,833, dated December 6, 1870; reissue No 5,618, dated October 21, 1873; application filed September 15, 1873.

*To all whom it may concern:*

Be it known that I, JOHAN WOLFGANG MORGENEIER, of Sheboygan, in the county of Sheboygan and State of Wisconsin, have invented an Improvement in Varnishes for Coating Photographic Negatives and Glasses, of which the following is a specification:

The nature of this invention relates to the production of a matt or ground-glass surface on solar and contact negatives, to improve their printing qualities, and to facilitate retouching either with lead-pencils or water-color, by coating the same with a varnish containing the ingredients, and in or about the proportions, as more fully hereinafter set forth. For this purpose I compound two solutions, the following being the formula for their preparation:

No. 1.—Dissolve in two and two-thirds ounces absolute alcohol, ninety-five per cent., by fluid measure; one-half ounce gum sandarac, (picked,) by weight; one and one-half dram turpentine, by weight; one dram oil of lavender, by weight.

No. 2.—Dissolve in five and one-half drams absolute alcohol, ninety-five per cent., fluid measure; one and one-third dram gum camphor, by weight; add one and one-third dram concentrated sulphuric ether, fluid measure; two and two-thirds drams pure rain-water, fluid measure.

Mix the two solutions together by thoroughly shaking them; let the varnish thus made stand a day or two, when it is ready for use, when it may be applied to a negative plate or glass in the same manner as collodion in the ordinary wet-process. After the negative is dried, the plate is coated with the varnish, drained, and set to dry in a cool place. When dry it will present a hard, matt, and ground-glass surface, resembling ground glass, which can be retouched and worked with ease and celerity with any grade of pencil from one to five, (Faber,) or with water-colors, by stippling or otherwise.

In varnishing solar negatives, let the plate drain well, and lie with the varnish side upward, on a perfect level to avoid streaks. The film on solar negatives does not lengthen the time required for printing.

The photographer should observe the following rules to produce the best results:

Use any intensifier, do not intensify much, as the negative is intensified to a certain extent by the varnish.

In extremely hot, cold, or damp weather the varnished plate, when dry, may appear spotted; revarnishing will cause the spots to disappear.

If necessary to use the plate immediately, allow the varnish to set a few seconds after draining the plate, and then dry over a moderate heat; but, in all cases, the plate must be cool when the varnish is applied.

If the negative has been touched too intensely, the work can be removed without injury to the film by using a soft, round, camel's-hair brush, dipped in water.

This varnish will not crack or peel, or stick to the paper, in any temperature.

What I claim as my invention, and desire to secure by Letters Patent, is—

A varnish for producing a matt or ground glass surface on photographic negatives and glass, compounded substantially as set forth.

JOHAN WOLFGANG MORGENEIER.

Witnesses:

AUGUST PRILLING,
WM. HAINERT.